(12) United States Patent
Quan et al.

(10) Patent No.: US 12,181,646 B2
(45) Date of Patent: Dec. 31, 2024

(54) OPTICAL SYSTEM AND PROJECTION DEVICE

(71) Applicant: Union Optech Co., Ltd., Zhongshan (CN)

(72) Inventors: Liwei Quan, Zhongshan (CN); Shoulin Li, Zhongshan (CN); Hao Wang, Zhongshan (CN); Junqiang Gong, Zhongshan (CN)

(73) Assignee: Union Optech Co., Ltd., Zhongshan (CN)

( * ) Notice: Subject to any disclaimer, the term of this patent is extended or adjusted under 35 U.S.C. 154(b) by 496 days.

(21) Appl. No.: 17/518,812

(22) Filed: Nov. 4, 2021

(65) Prior Publication Data

US 2022/0221698 A1 Jul. 14, 2022

(30) Foreign Application Priority Data

Jan. 13, 2021 (CN) .......................... 202110045485.6

(51) Int. Cl.
*G02B 13/16* (2006.01)
*G02B 3/04* (2006.01)
(Continued)

(52) U.S. Cl.
CPC .............. *G02B 13/16* (2013.01); *G02B 3/04* (2013.01); *G02B 9/64* (2013.01); *G02B 13/0045* (2013.01); *G03B 21/142* (2013.01)

(58) Field of Classification Search
CPC ........... G02B 13/16; G02B 3/04; G02B 9/64; G02B 13/0045; G02B 13/18;
(Continued)

(56) References Cited

U.S. PATENT DOCUMENTS

2011/0026111 A1* 2/2011 Nagatoshi .............. G03B 21/28
 359/364
2016/0178878 A1* 6/2016 Liu .................... G02B 17/0896
 359/364
(Continued)

FOREIGN PATENT DOCUMENTS

CN 104570296 A 4/2015
CN 107144944 A 9/2017
(Continued)

OTHER PUBLICATIONS

First Office Action issued in counterpart Chinese Patent Application No. 202110045485.6, dated Jul. 9, 2024.
(Continued)

*Primary Examiner* — Magda Cruz
(74) *Attorney, Agent, or Firm* — Westbridge IP LLC (57) ABSTRACT

The present application provides an optical system and a projection device. The optical system includes a display unit, a first lens group, a second lens group and a reflector which are sequentially arranged along a light transmission direction. The first lens group has a positive focal power, the second lens group has a negative focal power, a total of focal powers of the second lens group and the reflector is positive. A distance from a side of the first lens group close to the display unit to another side of the second lens group far away from the display unit is T0, a distance from the side of the second lens group far away from the display unit to the reflector is T, and T0/T is greater than or equal to 0.8 and less than or equal to 1.1. The optical system provided by the present application is small in size and portable.

18 Claims, 3 Drawing Sheets

(51) Int. Cl.
   *G02B 9/64* (2006.01)
   *G02B 13/00* (2006.01)
   *G03B 21/14* (2006.01)

(58) Field of Classification Search
   CPC ............ G02B 27/0012; G02B 15/1421; G03B 21/142; G03B 21/28; G03B 21/008; G03B 21/14
   See application file for complete search history.

(56) References Cited

U.S. PATENT DOCUMENTS

| | | | |
|---|---|---|---|
| 2018/0284403 A1* | 10/2018 | Gong | G02B 17/08 |
| 2022/0057704 A1* | 2/2022 | Quan | G02B 15/1421 |

FOREIGN PATENT DOCUMENTS

| | | | | |
|---|---|---|---|---|
| CN | 111856719 A | * | 10/2020 | ......... G02B 13/0065 |
| CN | 214201903 U | | 9/2021 | |
| EP | 2881776 A1 | | 6/2015 | |
| JP | 2008116688 A | | 5/2008 | |
| JP | 2009251457 A | | 10/2009 | |

OTHER PUBLICATIONS

Notification to Grant Patent Right for Invention issued in counterpart Chinese Patent Application No. 202110045485.6, dated Aug. 12, 2024.

* cited by examiner

OPTICAL SYSTEM AND PROJECTION DEVICE

CROSS-REFERENCE TO RELATED APPLICATIONS

The present application claims the benefit of Chinese Patent Application No. 202110045485.6 filed on Jan. 13, 2021. The disclosure of the aforementioned application is hereby incorporated by reference in its entirety.

TECHNICAL FIELD

The present application relates to the technical field of optical imaging, in particular to an optical system and a projection device.

BACKGROUND

With the development of projection technology in recent years, projectors are widely used in household and commercial fields. Generally, ultra-short focus optical systems mostly adopt the structure of refraction and reflection, and multiple optical lenses are used together to correct the aberration of the optical system in the projection device, so as to achieve the effect of projecting super-large pictures with a short distance. Most ultra-short focus optical systems are used in laser TVs and engineering fields, and are well accepted by consumers. However, the traditional ultra-short focus optical systems are very bulky and inconvenient to move.

The foregoing content is only used to assist in understanding the technical solution of the present application, and does not mean that the foregoing content is recognized as prior art.

SUMMARY

The main objective of the present application is to provide an optical system and a projection device, aiming at solving the technical problems that the optical systems of related art are large in volume and inconvenient to move.

To achieve the above objective, the present application provides an optical system. The optical system includes a display unit, a first lens group, a second lens group, and a reflector which are sequentially arranged along a light transmission direction;

the first lens group has a positive focal power;
the second lens group has a negative focal power;
a total of focal powers of the second lens group and the reflector is positive; and
a distance from a side of the first lens group close to the display unit to a side of the second lens group far away from the display unit is T0, and a distance from the side of the second lens group far away from the display unit to the reflector is T, T0/T is greater than or equal to 0.8 and less than or equal to 1.1.

Optionally, the focal power of the first lens group is greater than or equal to 0.1 and less than or equal to 0.2;
an absolute value of the focal power of the second lens group is greater than or equal to 0.01 and less than or equal to 0.03; and
the total of the focal powers of the second lens group and the reflector is greater than or equal to 0.15 and less than or equal to 0.3.

Optionally, the first lens group includes a first lens, a second lens, a third lens, a fourth lens, a fifth lens, a sixth lens, and a seventh lens arranged along the light transmission direction;
the second lens group includes an eighth lens, a ninth lens, a tenth lens, an eleventh lens, a twelfth lens, a thirteenth lens and a fourteenth lens arranged along the light transmission direction; and
the optical system further includes a diaphragm arranged between the first lens group and the second lens group.

Optionally, the first lens, the second lens, the third lens, the fifth lens, the seventh lens, the ninth lens, the tenth lens and the twelfth lens have positive focal powers; and the fourth lens, the sixth lens, the eighth lens, the eleventh lens, the thirteenth lens, and the fourteenth lens have negative focal powers.

Optionally, the second lens is a biconvex glass aspherical lens having a positive focal power $\phi 2$, and $0.05 \le |\phi 2| \le 0.09$; and the fourteenth lens includes a side close to the display unit and curved toward the display unit, and another side away from the display unit and curved toward the reflector, and the fourteenth lens has a positive focal power $\phi 14$, and $0.015 \le |\phi 14| \le 0.025$.

Optionally, the fourteenth lens is a plastic aspherical lens having a negative focal power $\phi 14'$, and $0.01 \le |\phi 14'| \le 0.05$; and
the fourteenth lens has an outer diameter D14, and D14/T0≥0.2.

Optionally, the third lens, the fourth lens and the fifth lens are cemented together to form a cemented lens;
the sixth lens and the seventh lens are cemented together to form another cemented lens; and
the twelfth lens and the thirteenth lens are cemented together to form still another cemented lens.

Optionally, a distance between the first lens group and the second lens group is greater than or equal to 5.9 mm and less than or equal to 6.4 mm; and
a distance between the second lens group and the reflector is greater than or equal to 29.25 mm and less than or equal to 29.75 mm.

Optionally, the display unit includes a DMD chip, the DMD chip is offset from an optical axis for more than 130%, and the DMD chip has a size greater than or equal to 0.23 inches and less than or equal to 0.33 inches.

In addition, the present application also provides a projection device including the optical system as described above.

The optical system includes a display unit, a first lens group, a second lens group and a reflector which are sequentially arranged along the light transmission direction. The first lens group has a positive focal power. The second lens group has a negative focal power. The total of the focal powers of the second lens group and the reflector is positive, the distance from the side of the first lens group close to the display unit to the side of the second lens group far away from the display unit is T0, the distance from the side of the second lens group far away from the display unit to the reflector is T, and T0/T is greater than or equal to 0.8 and less than or equal to 1.1. In this solution, an image light beam is emitted from the display unit, partial field curvature and distortion of the image light beam are corrected by the first lens group and the second lens group, and finally, the image light beam is reflected to a projection screen by the reflector to form an image, so that the distance between the display unit and the reflector is less than or equal to 80 mm and the projection ratio is 0.21 while maintaining high resolution, thus making the optical system ultra-small and portable.

BRIEF DESCRIPTION OF THE DRAWINGS

In order to more clearly explain the embodiments of the present application or the technical solutions in related art, the drawings required for the description of the embodiments or the related art will be briefly described below. It will be apparent that the drawings described below are only some embodiments of the present application, and other drawings may be obtained from the structure shown in those drawings without any creative effort by those of ordinary skill in the art.

The realization of the objective, functional features and advantages of the present application will be further explained with reference to the accompanying drawings and in connection with the embodiments.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by persons skilled in the art based on the embodiments of the present application without creative efforts shall fall within the scope of the present application.

It should be noted that if there are directional indications in the embodiment of the present application, the directional indications are only used to explain the relative positional relationship, movement, etc. between the components in a specific posture. If the specific posture changes, the directional indication changes accordingly.

In addition, if there are descriptions relating to "first", "second", etc. in embodiments of the present application, the descriptions of "first", "second", etc. are for descriptive purposes only and cannot be understood as indicating or implying relative importance or impliedly indicating the number of the indicated technical features. Thus, a feature defined as "first", or "second" may explicitly or implicitly include at least one of the features. In addition, the meaning of "and/or" in the whole text includes three parallel solutions, taking "A and/or B" as an example, "A and/or B" includes only solution A, only solution B, or both solution A and solution B. Further, the technical solutions of the various embodiments can be combined with each other, but must be made based on the realization of those ordinary skilled in the art. When the combination of technical solutions is contradictory or cannot be achieved, it should be considered that such a combination of technical solutions does not exist, nor does it fall within the protection scope of the present application.

At present, the ultra-short focus projection device 10 on the market mostly adopts the structure of refraction and reflection. In order to correct the aberration of the optical system in the projection device 10, a plurality of optical lenses are usually required to cooperate with each other in the optical system. In the related art, a refractive lens group in the optical system is usually provided with a plurality of lens groups, and the number of lenses in each lens group is large, resulting in a large volume of the optical system and the optical system being inconvenient to move.

In view of this, the present application provides an optical system and a projection device 10, aiming at solving the technical problems that the optical systems of related art are large in volume and inconvenient to move. Referring to FIGS. 1 to 5, an embodiment of the optical system and the projection device 10 provided by the present application is shown.

Figure 1:
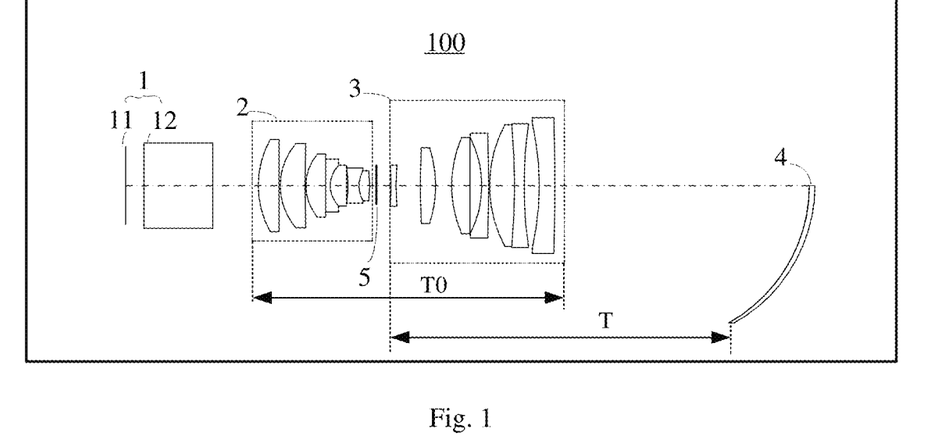
FIG. 1 is a schematic structural diagram of an embodiment of an optical system and a projection device provided by the present application.
Figure 2:
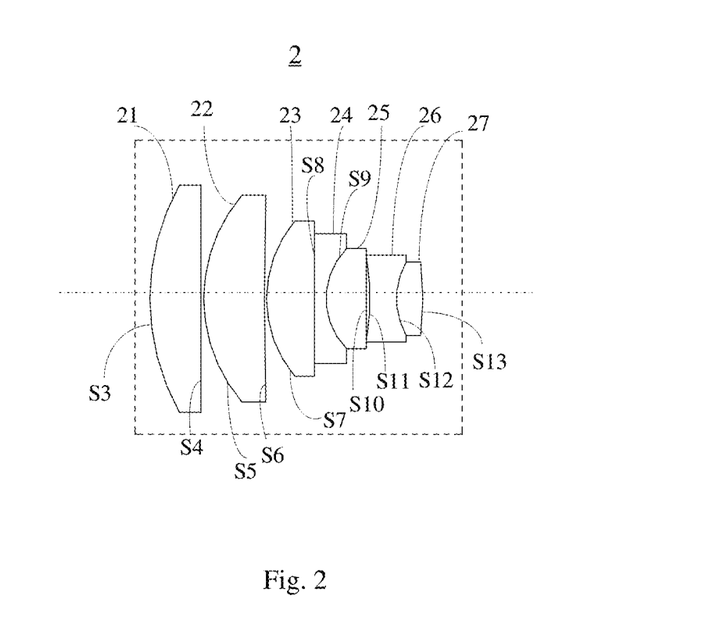
FIG. 2 is a schematic structural diagram of a first lens group in FIG. 1.
Figure 3:
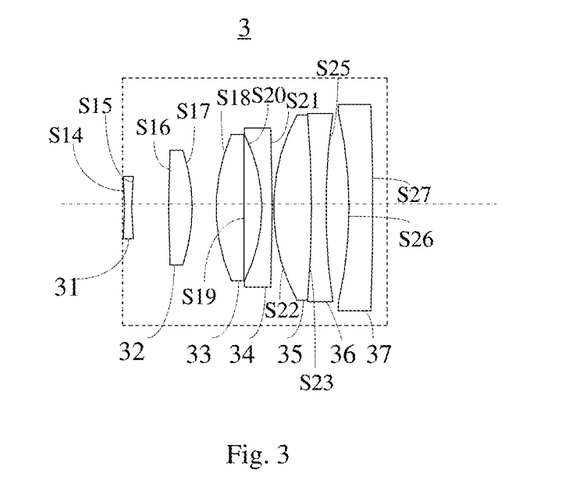
FIG. 3 is a schematic structural diagram of a second lens group in FIG. 1.

Referring to FIGS. 1 to 3, an optical system 100 includes a display unit 1, a first lens group 2, a second lens group 3, and a reflector 4 in sequence along a transmission direction of light. The first lens group 2 has a positive focal power, and the second lens group 3 has a negative focal power. The total of focal powers of the second lens group 3 and the reflector 4 is positive, a distance from a side of the first lens group 2 close to the display unit 1 to a side of the second lens group 3 far away from the display unit 1 is T0, a distance from the side of the second lens group 3 far away from the display unit 1 to the reflector 4 is T, and T0/T is greater than or equal to 0.8 and less than or equal to 1.1. In this solution, an image light beam is emitted from the display unit 1, partial field curvature and distortion of the image light beam are corrected by the first lens group 2 and the second lens group 3, and finally, the image light beam is reflected to a projection screen by the reflector 4 to form an image, so that the distance between the display unit 1 and the reflector 4 is less than or equal to 80 mm and the projection ratio is 0.21 while maintaining high resolution, thereby making the optical system 100 ultra-small and portable.

Understandably, the focal power is equal to the difference between the convergence of the beam of the image side and the convergence of the beam of the object side, which represents the ability of an optical element to deflect light. The greater the absolute value of the focal power is, the stronger the ability to bend light will be, and the smaller the absolute value of the focal power is, the weaker the ability to bend light will be. When the focal power is positive, the light is deflected to be convergent. When the power is negative, the light is deflected to be divergent. The focal power can be used to characterize a refractive surface of a lens (i.e., a surface of the lens), a lens or a system formed by multiple lenses (i.e., a lens group).

Further, the focal power of the first lens group 2 is greater than or equal to 0.1 and less than or equal to 0.2. The absolute value of the focal power of the second lens group 3 is greater than or equal to 0.01 and less than or equal to 0.03. The total of focal powers of the second lens group 3 and the reflector 4 is greater than or equal to 0.15 and less than or equal to 0.3. The resolution of the optical system 100 is improved by the above-mentioned focal power matching.

Further, referring to FIGS. 2 and 3, the first lens group 2 includes a first lens 21, a second lens 22, a third lens 23, a fourth lens 24, a fifth lens 25, a sixth lens 26, and a seventh lens 27 arranged along the transmission direction of light. The second lens group 3 includes an eighth lens 31, a ninth lens 32, a tenth lens 33, an eleventh lens 34, a twelfth lens 35, a thirteenth lens 36, and a fourteenth lens 37 arranged along the transmission direction of light. A diaphragm 5 is also arranged between the first lens group 2 and the second lens group 3. The combination of the first lens 21 to the fourteenth lens 37 causes light rays to be refracted a plurality of times during transmission, thereby achieving the effect of reducing aberration. The diaphragm 5 is mainly used to limit the number of the light rays or the size of the field of view of the optical system 100, and in particular, the diaphragm 5 is used to limit the number of light rays entering the eighth lens 31 from the seventh lens 27.

Specifically, the first lens 21, the second lens 22, the third lens 23, the fifth lens 25, the seventh lens 27, the ninth lens 32, the tenth lens 33, and the twelfth lens 35 have positive focal powers. The fourth lens 24, the sixth lens 26, the eighth lens 31, the eleventh lens 34, the thirteenth lens 36, and the fourteenth lens 37 have negative focal powers. The lenses of the first lens 21 to the fourteenth lens 37 with different focal powers cause the light emitted from the display unit 1 to be refracted differently a plurality of times when passing through the first lens 21 to the fourteenth lens 37, thereby further enabling the light to be transmitted to the reflector 4 with a small aberration.

Figure 4:
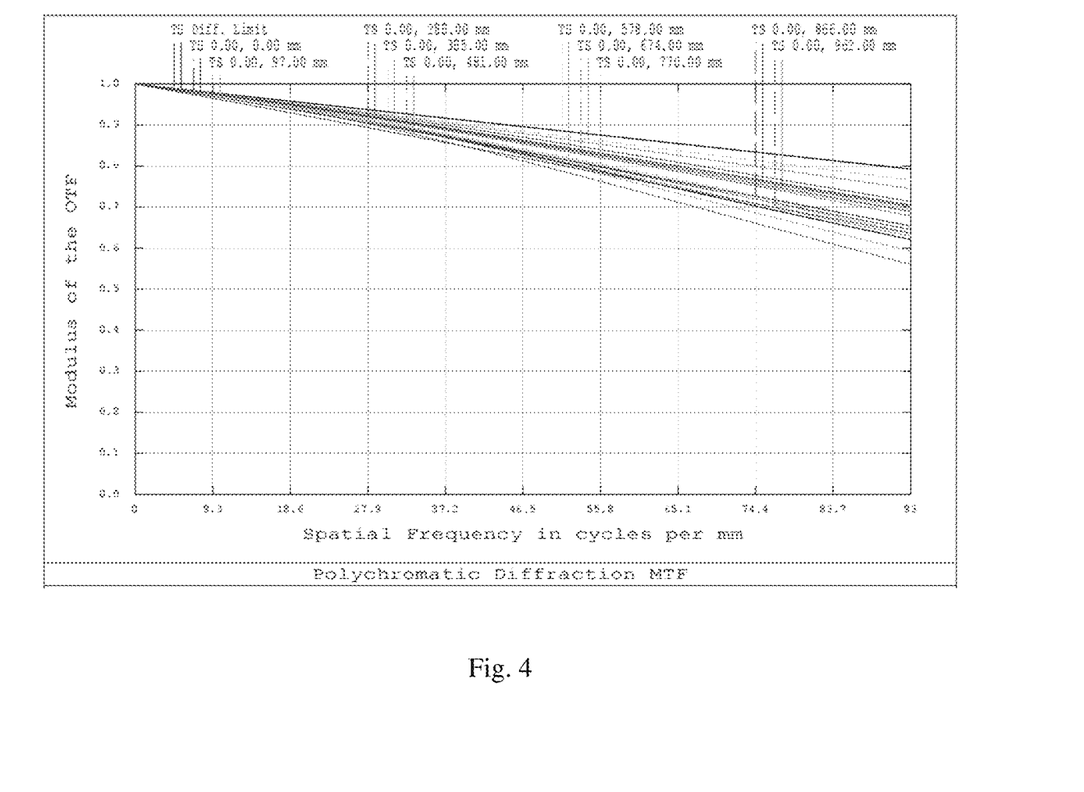
FIG. 4 is a schematic MTF curve diagram of the optical system and the projection device of FIG. 1.

Further, referring to FIG. 4, the second lens 22 is a biconvex glass aspherical lens, and the focal power (2 of the second lens 22 is positive, where $0.05 \leq |\phi 2| \leq 0.09$. The fourteenth lens 37 is curved toward the display unit 1 on a side close to the display unit 1 and toward the reflector 4 on a side away from the display unit 1, and has a positive focal power $\phi 14$, where $0.015 \leq |\phi 14| \leq 0.025$. When the above conditions are met, the field curvatures and distortions under different projection distances can be corrected, the resolutions under different projection distances can be kept unchanged, and the projection picture of larger than or equal to 40 inches and less than or equal to 100 inches can be realized.

Figure 5:
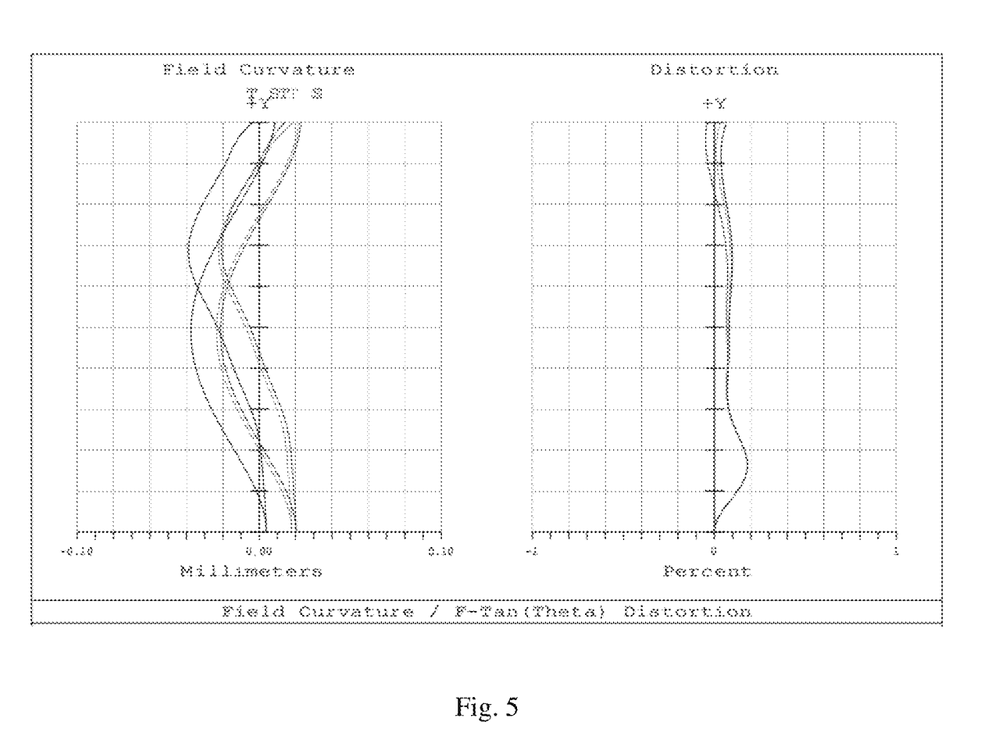
FIG. 5 is a field curvature diagram and a distortion curve diagram of the optical system and the projection device of FIG. 1.

Further, referring to FIG. 5, the fourteenth lens 37 is a plastic aspherical lens, and the focal power $\phi 14'$ of the fourteenth lens 37 is negative, where $0.01 \leq |\phi 14'| \leq 0.05$. The fourteenth lens 37 has an outer diameter D14, where $D14/T0 \geq 0.2$. Therefore, when the output brightness is less than 1000 lumens, the optical focus does not drift, and the effect that the picture is still clear and no focusing is needed when the optical system 100 is turned on for a long time is achieved.

Further, the third lens 23, the fourth lens 24 and the fifth lens 25 are cemented together to form a cemented lens, the sixth lens 26 and the seventh lens 27 are cemented together to form another cemented lens, and the twelfth lens 35 and the thirteenth lens 36 are cemented together to form still another cemented lens to eliminate chromatic aberration. It is understandable that the chromatic aberration is formed after the light passing through a lens, which makes the imaging blurred. Therefore, chromatic aberration has become a serious defect in lens imaging. A cemented lens is formed by cementing a plurality of lenses with different materials. When light passes through one of the lenses of the cemented lens and is refracted, chromatic aberration is generated, and when the refracted light continues to pass through another lens, the generated chromatic aberration is just reversed and can counteract the previous chromatic aberration, thereby achieving the purpose of eliminating chromatic aberration.

Further, the projection range of the optical system 100 can be ranged from 40 inches to 100 inches, and the second lens group 3 moves to focus so as to adjust the resolution of the picture at different projection distances. The distance between the first lens group 2 and the second lens group 3 during focusing is greater than or equal to 5.9 mm and less than or equal to 6.4 mm. The distance between the second lens group 3 and the reflector 4 is greater than or equal to 29.25 mm and less than or equal to 29.75 mm, thereby realizing high-resolution imaging.

Further, the display unit 1 includes a digital micromirror device (DMD) chip 11 which is offset from the optical axis for more than 130%. The size of the DMD chip 11 is greater than or equal to 0.23 inches, and less than or equal to 0.33 inches, so that the image definition is improved while the volume is reduced. Specifically, the display unit 1 further includes an equivalent prism 12 disposed between the DMD chip 11 and the first lens group 2, which can reduce the aberration caused by refractive transmission of light rays.

In the present embodiment, each of the equivalent prism 12 and the lenses of the first lens 21 to the fourteenth lens 37 has a light entry surface and a light exit surface along the light transmission direction. Specifically, in the figures, the light entry surface and the light exit surface of the equivalent prism 12 are indicated by S1 and S2 respectively, the light entry surface and the light exit surface of the first lens 21 are indicated by reference numbers S3 and S4 respectively, the light entry surface and the light exit surface of the second lens 22 are indicated by reference numbers S5 and S6 respectively, the light entry surface of the third lens 23 is indicated by reference number S7, the light exit surface of the fifth lens 25 is indicated by reference number S10, the light entry surface of the sixth lens 26 is indicated by reference number S11, the light exit surface of the seventh lens 27 is indicated by reference number S13, the light entry surface and the light exit surface of the eighth lens 31 are indicated by reference numbers S14 and S15 respectively, the light entry surface and the light exit surface of the ninth lens 32 are indicated by reference numbers S16 and S17 respectively, the light entry surface and the light exit surface of the tenth lens 33 are indicated by reference numbers S18 and S19 respectively, the light entry surface and the light exit surface of the eleventh lens 34 are indicated by reference numbers S21 and S20 respectively, the light exit surface of the twelfth lens 35 is indicated by reference number S22, the light exit surface of the thirteenth lens 36 is indicated by reference number S25, and the light entry surface and the light exit surface of the fourteenth lens 37 are indicated by reference numbers S26 and S27 respectively. Further, a cementing surface of the third lens 23 and the fourth lens 24 is indicated by reference number S8, a cementing surface of the fourth lens 24 and the fifth lens 25 is indicated by reference number S9, a cementing surface of the sixth lens 26 and the seventh lens 27 is indicated by reference number S12, and a cementing surface of the twelfth lens 35 and the thirteenth lens 36 is indicated by reference number S23.

Specifically in this embodiment the parameters of the optical system 100 are shown in the following table.

TABLE 1

| | Parameters Of Each Lens Of The Optical System | | | | |
|---|---|---|---|---|---|
| Surface | reference number | Type | Radius R/mm | Thickness/ mm | Optical material |
| IMA | | Image plane | Infinity | 0 | |
| The light entry surface of the equivalent prism | S1 | Standard | Infinity | −8 | H-LAF50B |
| The light exit surface of the equivalent prism | S2 | Standard | Infinity | −3.75 | |

TABLE 1-continued

Parameters Of Each Lens Of The Optical System

| Surface | reference number | Type | Radius R/mm | Thickness/ mm | Optical material |
|---|---|---|---|---|---|
| The light entry surface of the first lens | S3 | Standard | 11.07011 | −2.57 | |
| The light exit surface of the first lens | S4 | Standard | −453.171 | −2.44 | FC5 |
| The light entry surface of the second lens | S5 | Aspheric | 7.483362 | −0.1 | |
| The light exit surface of the second lens | S6 | Aspheric | −106.812 | −2.87 | M-FCD1 |
| The light entry surface of the third lens | S7 | Standard | 5.717516 | −0.1 | |
| M1 | S8 | Standard | Infinity | −2.27 | FCD1 |
| M2 | S9 | Standard | 3.394409 | −0.54 | H-ZF52A |
| The light exit surface of the fifth lens | S10 | Standard | Infinity | −1.90 | FCD1 |
| The light entry surface of the sixth lens | S11 | Standard | −12.821 | −0.16 | |
| M3 | S12 | Standard | 3.567711 | −1.25 | H-ZLAF50B |
| The light exit surface of the seventh lens | S13 | Standard | −13.491 | −1.25 | H-ZF52 |
| STO | | Diaphragm | Infinity | −0.35 | |
| The light entry surface of the eighth lens | S14 | Standard | −23.746 | −5.8 | |
| The light exit surface of the eighth lens | S15 | Standard | 23.74601 | −0.54 | FCD1 |
| The light entry surface of the ninth lens | S16 | Standard | 75.04273 | −2.81 | |
| The light exit surface of the ninth lens | S17 | Standard | −14.282 | −1.79 | H-ZF10 |
| The light entry surface of the tenth lens | S18 | Standard | 14.00674 | −1.83 | |
| The light exit surface of the tenth lens | S19 | Standard | Infinity | −2.13 | H-F1 |
| The light entry surface of the eleventh lens | S20 | Standard | −12.4141 | −1.36 | |
| The light exit surface of the eleventh lens | S21 | Standard | −167.595 | −0.795 | H-ZF52A |
| The light entry surface of the twelfth lens | S22 | Standard | 14.95415 | −0.1 | |
| M4 | S23 | Standard | −80.4815 | −2.90 | H-QK3L |
| The light exit surface of the thirteenth lens | S24 | Standard | 50.16436 | −1.09 | TAFD25 |
| The light entry surface of the fourteenth lens | S25 | Aspheric | −29.7553 | −1.77 | |
| The light exit surface of the fourteenth lens | S26 | Aspheric | 28.25564 | −1.81 | E48R |
| Reflector | S27 | Aspheric | −13.472 | −29.50 | MIRROR |
| OBJ | | Object plane | Infinity | 275 | |

The shapes of the aspheric surfaces of the reflector 4, the second lens 22, and the fourteenth lens 37 satisfy the following equation:

$$Z = cy^2 / \{1 + \sqrt{1-(1+k)c^2y^2}\} + a_1y^2 + a_2y^4 + a_3y^6 + a_4y^8 + a_5y^{10} + a_6y^{12} + a_7y^{14} + a_8y^{16}$$

where c is a curvature corresponding to the radius; y is a radial coordinate (the unit of the radial coordinate is the same as the unit of the lens length); k is a conic coefficient, when k is less than −1, the curve of the surface shape of the lens is hyperbola, when k is equal to −1, the curve of the surface shape of the lens is parabola, when k is between −1 and 0, the curve of the surface shape of the lens is ellipse, when k is equal to 0, the curve of the surface shape of the lens is circular, and when k is greater than 0, the curve of the surface shape of the lens is oblate; a1 to a8 represent coefficients corresponding to radial coordinates.

In this embodiment, the even order coefficients of each aspheric surface are shown in the following table.

TABLE 2

Coefficients Of Reflector And The Aspheric Lenses Including
The Second Lens and The Fourteenth Lens

| reference number | S6 | S7 | S25 | S26 | S27 |
|---|---|---|---|---|---|
| K | −0.004199897 | −109.2158 | −1.674944 | 2.713719 | −2.477442 |
| A1 | 0 | 0 | 0 | 0 | 0 |
| A2 | −2.0487294 E−005 | 0.00044232136 | 6.0197028 E−005 | −0.00050027906 | −5.7342322 E−005 |

TABLE 2-continued

Coefficients Of Reflector And The Aspheric Lenses Including
The Second Lens and The Fourteenth Lens

| reference number | S6 | S7 | S25 | S26 | S27 |
|---|---|---|---|---|---|
| A3 | −7.6341053 E−006 | −1.8082764 E−005 | −1.8936162 E−006 | 4.5976099 E−006 | 1.6145479 E−007 |
| A4 | 9.6321341 E−007 | 2.9705106 E−006 | 1.337263 E−007 | −5.3309026 E−008 | −4.2100693 E−010 |
| A5 | −5.8305605 E−008 | −2.8559975 E−007 | −5.435665 E−009 | 3.0688044 E−010 | −8.7602982 E−013 |
| A6 | −5.8305605 E−008 | 1.4890765 E−008 | −2.0923673 E−015 | −2.0923673 E−015 | 1.133532 E−014 |
| A7 | 1.8345504 E−009 | −3.8937673 E−010 | −9.8291941 E−013 | 1.6861226 E−015 | −3.5950126 E−010 |
| A8 | 2.3048197 E−013 | 4.9982209 E−012 | 2.8249201 E−015 | −3.6334168 E−018 | 4.9505331 E−020 |

E−001 represents $10^{-1}$, E−002 represents $10^{-2}$ ..., E−010 represents $10^{-10}$, and so on, and E-N represents $10^{-N}$.

The above is only an alternative embodiment of the present application, and is not to limit the scope of the present application. Any equivalent structural transformation made by using the contents of the present specification and drawings, or any direct/indirect application in other related technical fields, under the inventive concept of the present application, is included in the scope of the present application.

What is claimed is:

1. An optical system comprising a display unit, a first lens group, a second lens group, and a reflector which are sequentially arranged along a light transmission direction; wherein:
the first lens group has a positive focal power;
the second lens group has a negative focal power;
a total of focal powers of the second lens group and the reflector is positive; and
a distance from a side of the first lens group close to the display unit to a side of the second lens group far away from the display unit is T0, and a distance from the side of the second lens group far away from the display unit to the reflector is T, T0/T is greater than or equal to 0.8 and less than or equal to 1.1.

2. The optical system of claim 1, wherein:
the focal power of the first lens group is greater than or equal to 0.1 and less than or equal to 0.2;
an absolute value of the focal power of the second lens group is greater than or equal to 0.01 and less than or equal to 0.03; and
the total of the focal powers of the second lens group and the reflector is greater than or equal to 0.15 and less than or equal to 0.3.

3. The optical system of claim 2, wherein:
the first lens group includes a first lens, a second lens, a third lens, a fourth lens, a fifth lens, a sixth lens, and a seventh lens arranged along the light transmission direction;
the second lens group includes an eighth lens, a ninth lens, a tenth lens, an eleventh lens, a twelfth lens, a thirteenth lens and a fourteenth lens arranged along the light transmission direction; and
the optical system further comprises a diaphragm arranged between the first lens group and the second lens group.

4. The optical system of claim 3, wherein:
the first lens, the second lens, the third lens, the fifth lens, the seventh lens, the ninth lens, the tenth lens and the twelfth lens have positive focal powers; and
the fourth lens, the sixth lens, the eighth lens, the eleventh lens, the thirteenth lens, and the fourteenth lens have negative focal powers.

5. The optical system of claim 3, wherein:
the second lens is a biconvex glass aspherical lens having a positive focal power $\phi2$, and $0.05 \leq |\phi2| \leq 0.09$; and
the fourteenth lens includes a side close to the display unit and curved toward the display unit, and another side away from the display unit and curved toward the reflector, and the fourteenth lens has a positive focal power $\phi14$, and $0.015 \leq |\phi14| \leq 0.025$.

6. The optical system of claim 3, wherein:
the fourteenth lens is a plastic aspherical lens having a negative focal power $\phi14'$, and $0.01 \leq |\phi14'| \leq 0.05$; and
the fourteenth lens has an outer diameter D14, and D14/T0≥0.2.

7. The optical system of claim 3, wherein:
the third lens, the fourth lens and the fifth lens are cemented together to form a cemented lens;
the sixth lens and the seventh lens are cemented together to form another cemented lens; and
the twelfth lens and the thirteenth lens are cemented together to form still another cemented lens.

8. The optical system of claim 1, wherein:
a distance between the first lens group and the second lens group is greater than or equal to 5.9 mm and less than or equal to 6.4 mm; and
a distance between the second lens group and the reflector is greater than or equal to 29.25 mm and less than or equal to 29.75 mm.

9. The optical system of claim 1, wherein:
the display unit includes a digital micromirror device (DMD) chip, wherein:
the DMD chip is offset from an optical axis for more than 130%; and
the DMD chip has a size greater than or equal to 0.23 inches and less than or equal to 0.33 inches.

10. A projection device comprising the optical system of claim 1.

11. The projection device of claim 10, wherein:
the focal power of the first lens group is greater than or equal to 0.1 and less than or equal to 0.2;
an absolute value of the focal power of the second lens group is greater than or equal to 0.01 and less than or equal to 0.03; and a total of focal powers of the second lens group and the reflector is greater than or equal to 0.15 and less than or equal to 0.3.

12. The projection device of claim 11, wherein:
the first lens group includes a first lens, a second lens, a third lens, a fourth lens, a fifth lens, a sixth lens, and a seventh lens arranged along the light transmission direction;
the second lens group includes an eighth lens, a ninth lens, a tenth lens, an eleventh lens, a twelfth lens, a thirteenth lens and a fourteenth lens arranged along the light transmission direction; and
the optical lens group further comprises a diaphragm arranged between the first lens group and the second lens group.

13. The projection device of claim 12, wherein:
the first lens, the second lens, the third lens, the fifth lens, the seventh lens, the ninth lens, the tenth lens and the twelfth lens have positive focal powers; and
the fourth lens, the sixth lens, the eighth lens, the eleventh lens, the thirteenth lens, and the fourteenth lens have negative focal powers.

14. The projection device of claim 12, wherein:
the second lens is a biconvex glass aspherical lens having a positive focal power $\phi2$, and $0.05 \leq |\phi2| \leq 0.09$; and
the fourteenth lens comprises a side close to the display unit and curved toward the display unit, and another side away from the display unit and curved toward the reflector, and the fourteenth lens has a positive focal power $\phi14$, and $0.015 \leq |\phi14| \leq 0.025$.

15. The projection device of claim 12, wherein:
the fourteenth lens is a plastic aspherical lens having a negative focal power $\phi14'$, and $0.01 \leq |\phi14'| \leq 0.05$; and
the fourteenth lens has an outer diameter D14, and $D14/T0 \geq 0.2$.

16. The projection device of claim 12, wherein:
the third lens, the fourth lens and the fifth lens are cemented together to form a cemented lens;
the sixth lens and the seventh lens are cemented together to form another cemented lens; and
the twelfth lens and the thirteenth lens are cemented together to form still another cemented lens.

17. The projection device of claim 10, wherein:
a distance between the first lens group and the second lens group is greater than or equal to 5.9 mm and less than or equal to 6.4 mm; and
a distance between the second lens group and the reflector is greater than or equal to 29.25 mm and less than or equal to 29.75 mm.

18. The projection device of claim 10, wherein the display unit comprises a DMD chip, wherein:
the DMD chip is offset from an optical axis for more than 130%; and
the DMD chip has a size greater than or equal to 0.23 inches and less than or equal to 0.33 inches.

* * * * *